C. B. KNODLE.
PISTON RING.
APPLICATION FILED SEPT. 24, 1915.
1,198,457.
Patented Sept. 19, 1916
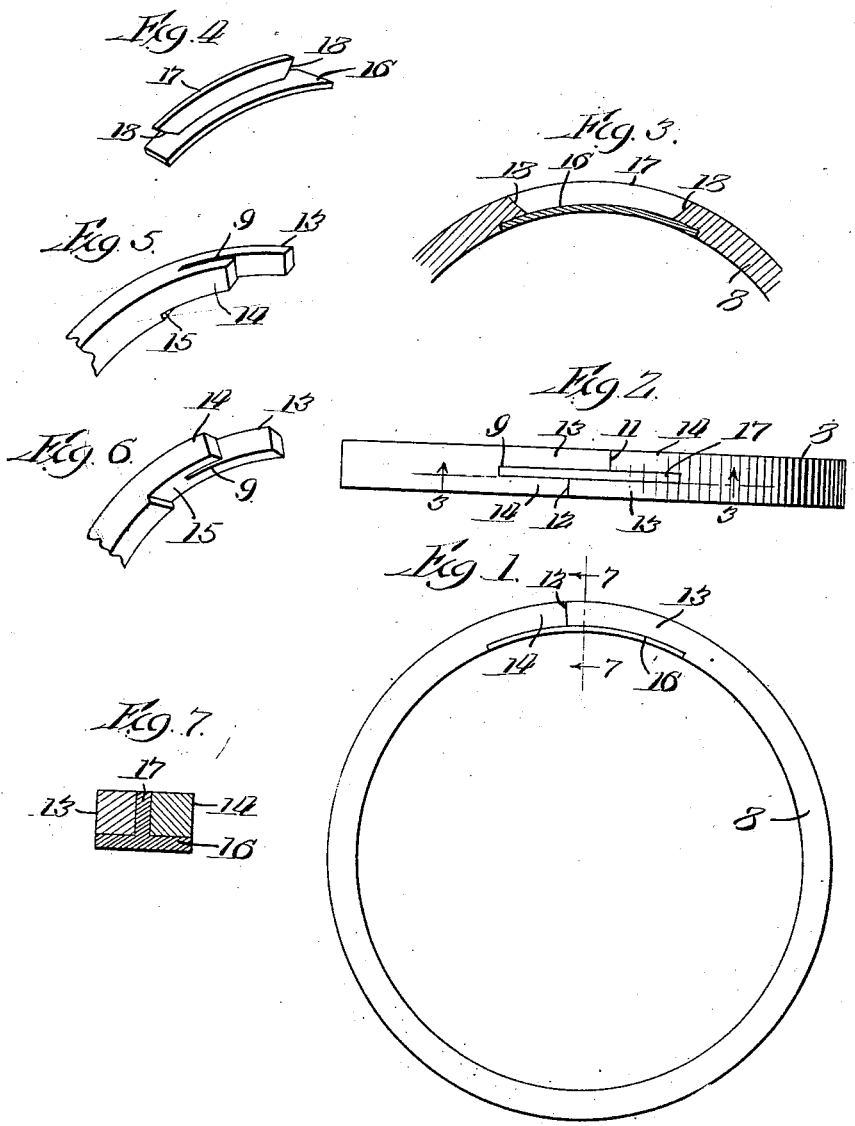

UNITED STATES PATENT OFFICE.

CLARENCE B. KNODLE, OF ROCKFORD, ILLINOIS, ASSIGNOR OF ONE-HALF TO HERMAN W. FLORIN, OF ROCKFORD, ILLINOIS.

PISTON-RING.

1,198,457.     Specification of Letters Patent.     Patented Sept. 19, 1916.

Application filed September 24, 1915. Serial No. 52,412.

*To all whom it may concern:*

Be it known that I, CLARENCE B. KNODLE, a citizen of the United States, residing at Rockford, in the county of Winnebago and State of Illinois, have invented certain new and useful Improvements in Piston-Rings, of which the following is a specification.

This invention relates to piston rings in general and more particularly to those designed for use on the pistons of internal combustion engines to prevent the leakage of gases under high pressure past the pistons.

One of the requisites of a piston ring of this character is that it be provided with an expansible joint which may be spread to enable the ring to be placed in position on the piston, and which will permit the ring to expand as it becomes worn so that it will always snugly fit the walls of the surrounding cylinder.

Various types of joints have been devised prior to my invention but so far as I am aware none of them have been entirely satisfactory for the reason that they will usually permit the leakage of gas past the ring joints when the rings expand in usage, and in some types of ring the joints are not strong and durable enough to withstand the excessive pressure to which they are subjected, and in some instances the construction is so complicated that the expense of manufacturing is prohibitive.

The primary object of my present invention is to provide a piston ring which will be strong and durable and economical to manufacture and which will embody a leakproof joint which will prevent leakage past the ring no matter how long the ring may be in use. With this and other objects in view which will be appreciated as the invention is better understood I have devised a ring, one embodiment of which is described in the following specification and illustrated on the accompanying sheet of drawings, referring to which—

Figure 1 is a plan view of a piston ring embodying my invention; Fig. 2 is a side elevation thereof; Fig. 3 is a sectional view on the line 3—3 of Fig. 2; Fig. 4 is a detail perspective view of my improved joint member; Figs. 5 and 6 are perspective views taken at different angles of one end of my improved ring, and Fig. 7 is a transverse sectional view on the line 7—7 of Fig. 1.

On the drawings reference character 8 designates generally a piston ring, which may be either of the concentric or eccentric type and is made of metal as is customary in rings of this character. On that side of the ring where the joint is located I have provided a radially extending slot 9 disposed midway between the upper and lower faces of the ring and extending some little distance into each end of the ring, as shown in Fig. 2, thus producing a ring having bifurcated ends. The ring is cut transversely on each side of the slot 9 to provide joints 11 and 12 which are offset with respect to each other, as shown in Fig. 2. The slot 9 together with the location of the cuts or joints 11 and 12 produce at each end of the ring a long prong 13 and a short prong 14, the long prongs being adapted to overlap each other on opposite sides of the slot 9 when the ring is compressed as shown in Fig. 2.

The inner circumference of the ring is undercut as indicated by reference character 15, beneath the slot 9 this undercut being extended beyond each end of the slot, as shown. The end walls of the slot itself are formed on arcs of a common circle, as is best shown in Fig. 3, this curving of the end walls being adapted to insure a good fit with the ends of a joint member which will be later described, and furthermore, this shape is economical to attain as the slot may be produced by a milling cutter, the circumference of which is equal to the circumference of the circle of which it is desired that the end walls constitute arcs.

To render the joint in the ring itself, which has just been described, leak-proof I have provided a joint member, shown in perspective in Fig. 4, which comprises a base 16 curved concentrically on its inner face with the inner circumference of the ring, the base being the same thickness, length and width as the undercut 15 in the ring, so that the base will fit therein and virtually form a continuation of the inner circumference of the ring. Upon the base member and preferably formed integrally therewith is an upright or radial centrally disposed and longitudinally extending wall 17 corresponding in length, depth and thickness with the slot 9 into which it slidingly fits. The ends 18 of the wall 17 are formed on arcs corresponding with the end walls of the slot 9, so that when the joint member is in position and the ring is compressed a continuous and practically solid although yielding ring is produced.

As the ring expands, due to wear thereof and of the cylindrical walls, the joint member is held against inward displacement relatively to the ends of the ring by the inwardly converging faces 18, consequently a good fitting joint is maintained during all conditions of usage. It will also be noted that by reason of the peculiar shape of the ends of the joint member the same is held in place on the ring so that in assembling, packing and handling the rings, the joint members will not become dislodged from the rings. This construction at the same time permits quick and easy removal of the joint member from the ring by springing the ring open sufficiently to withdraw one of the ends 18 to clear the face of the ring.

Since the prongs 13 of the ring overlap each other by reason of the location of the joints 11 and 12 it will be obvious that lateral pressure on the ring is resisted not only by the wall 17 of the joint member but also by the other prong 13. Therefore the ring is very strong and possesses high resisting qualities against lateral pressure. Since the base and the wall 17 of the joint member are integral and since the wall 17 extends outwardly flush with the outer circumference of the ring it is obvious that any leakage past the joints can take place only by the gases passing into one of the joints between the opposed ends 13 and 14, traveling along the wall 17 to the end thereof, then back along the opposite face of the wall to the other joint. But since the wall 17 fits snugly within the slot 9 the probability or possibility of leakage in this manner is reduced to a minimum and my improved ring is consequently not only strong and durable but is in reality leak-proof. The joint member, by reason of the shape of the slot and the wall 17, need not be riveted or otherwise rigidly secured in position but may be inserted in place by simply spreading the ring and when the ring is in position on the piston it may expand sufficiently to snugly fit the surrounding cylinder walls without causing leakage past the joints. Should the joint member by any mishap become injured or distorted it may be readily removed and replaced by a new member easily and speedily by unskilled labor.

It is believed that my invention and its attendant advantages will be understood from the foregoing without further description, but it should be manifest that the size, shape and proportion of the various parts are capable of considerable variation without departing from the scope of the invention as defined by the following claims.

I claim:

1. A piston ring, comprising a ring undercut throughout a portion of its length on its inner circumference and provided with a slot of less length than said undercut portion and communicating with said undercut portion, said ring being cut at each side of said slot to provide joints offset with respect to each other, and a joint member having a radial portion slidingly fitting said slot, and a base portion rigid therewith disposed in the undercut portion of said ring, the ends of said slot and radial portion being associated and converged inwardly so that the joint member is held by said associated ends against inward displacement relatively to the ring.

2. A piston ring, comprising a ring having a circumferential radial slot, the ends of which converge inwardly, said ring being undercut on its inner face beneath and at each end of said slot, and a joint member comprising a base shaped to fit said undercut portion of the ring, and a longitudinally extending radial wall rigidly connected with said base and fitting within said slot and the converging ends thereof whereby leakage past the joints of said ring is prevented.

3. A piston ring, undercut throughout a portion of its length on its inner circumference and provided with a slot having the ends thereof formed on the arcs of a circle, said ring being provided with transverse joints on opposite sides of said slot, offset with respect to each other, in combination with a joint member comprising a base disposed in the undercut portion of the ring, and a radially extending wall disposed in said slot, the ends of said wall being shaped to correspond with the curved ends of the slot, said joint member being adapted to prevent leakage past the ring through the joints thereof.

CLARENCE B. KNODLE.